UNITED STATES PATENT OFFICE.

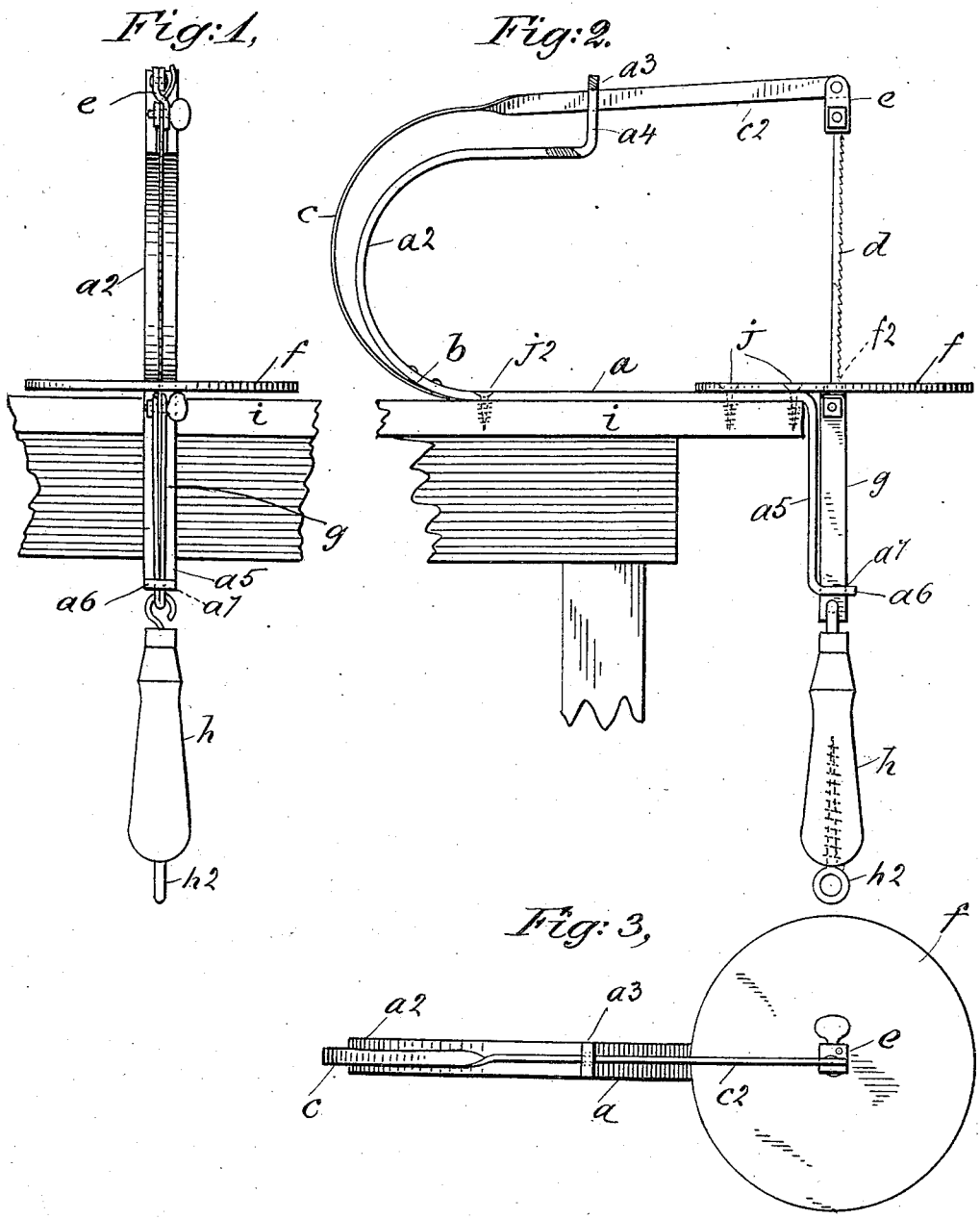

WILLIAM E. LAWRENCE, OF BROOKLYN, NEW YORK.

JIG OR SCROLL SAW.

No. 879,656.  Specification of Letters Patent.  Patented Feb. 18, 1908.

Application filed May 21, 1907. Serial No. 374,822.

*To all whom it may concern:*

Be it known that I, WILLIAM E. LAWRENCE, a citizen of the United States, and residing at Brooklyn, in the county of Kings and State of New York, have invented certain new and useful Improvements in Jig or Scroll Saws, of which the following is a specification, such as will enable those skilled in the art to which it appertains to make and use the same.

This invention relates to what are known as jig or scroll saws, and the object thereof is to provide an improved device of this class which is simple and comparatively inexpensive in construction and effective in operation and which may be conveniently secured to a table, bench or other support so as to be operated, or manipulated, in the manner of other devices of this class.

The invention is fully disclosed in the following specification, of which the accompanying drawing forms a part, in which the separate parts of my improvement are designated by suitable reference characters in each of the views, and in which:—

Figure 1 is a front view of my improved jig or scroll saw and showing the same secured to a table or other support; Fig. 2 a side view thereof; and, Fig. 3 a plan view of the saw detached from the table or other support.

In the practice of my invention I provide a support or frame member comprising a plate $a$ one end of which is bent to form a U-shaped arm $a^2$ which extends upwardly and is directed forwardly over the plate $a$ and the arm $a^2$ is provided with an upwardly directed member $a^3$ having a vertically arranged slot or opening $a^4$, and the end of the plate $a$ opposite the arm $a^2$ is provided with a downwardly directed member or arm $a^5$ having a forwardly directed extension $a^6$ provided with a slot or opening $a^7$.

Secured to the base of the arm $a^2$ and on the outer side thereof as shown at $b$ is a curved spring $c$ the curve of which is greater and corresponds with the curve of the arm $a^2$, and said curved spring $c$ is provided with a forwardly directed arm $c^2$ which passes through the slot or opening $a^4$ in the upwardly directed member $a^3$ of the arm $a^2$.

Connected with the forward end of the arm $c^2$ is the saw blade $d$, this connection, in the form of construction shown, being made by means of a loop-shaped link member $e$, but said connection may be made in any desired manner, and secured to the front end of the plate $a$ is work piece support, disk or plate $f$ which in the construction shown is circular in form but which may be of any desired shape, and said plate $f$ is provided approximately centrally thereof with a hole or opening $f^2$, and the saw blade $d$ passes downwardly through said hole or opening, and connected with the lower end of the saw is a bar or similar device $g$ which passes downwardly through the slot or opening $a^7$ in the part $a^6$ of the depending member $a^5$ of the plate $a$, and connected with the lower end of said bar is a handle $h$ by means of which the saw may be manipulated by hand if desired, and said handle member $h$ is also provided with a ring, link or similar device $h^2$ with which a pedal may be connected if it is desired to operate the saw by means of foot power. I have also shown at $i$ a part of a table to which my improved jig or scroll saw may be secured, and in the form of construction shown the work piece support $f$ is secured to the plate $a$ by means of screws $j$ which also secure the jig or scroll saw to the table $i$, another screw or screws $j^2$ being also employed for this purpose, but it will be understood that the work piece support $f$ may be connected with the plate $a$ in any desired manner, and in practice said work piece support will be connected with the plate $a$ independently of the devices which connect the jig or scroll saw with the table.

In practice the work piece is placed on the support $f$ and manipulated in the usual manner and the saw blade $d$ is moved up and down by means of the handle $h$ or by foot power if desired, and in this operation the upward movement of the saw is accomplished by the spring arm $c^2$, and the extent of both movements of the arm $a^2$ and the saw blade $d$ is limited by the length of the slot or opening $a^4$ in the upwardly directed member $a^3$ of the arm $a^2$.

It will be understood that the parts $a$, $a^2$, $a^3$, $a^5$ and $f$ form the framework of the operative or movable parts of the device, while the spring arm $c^2$, the saw blade $d$ and the bar $g$ connected with the lower end of the saw blade form the operative or movable parts, and it will also be understood that changes in and modifications of the frame work of the device may be made without departing from the spirit of my invention, or sacrificing its advantages.

Having fully described my invention, what I claim as new and desire to secure by Letters Patent, is:—

1. A jig or scroll saw comprising a bottom frame member provided at one end with an upwardly and forwardly curved frame arm having at its front end an upwardly directed member provided with a vertically arranged slot or opening, said bottom frame member being also provided at its opposite or front end with a downwardly directed arm having a laterally or forwardly directed extension provided with a slot or opening, and a spring secured to the base portion of the upwardly and forwardly directed frame arm and the free end of which is provided with an arm which passes forwardly through the slot or opening in the upwardly directed member of said arm, a saw blade connected with the free end of said spring arm and passing downwardly through a work support plate connected with the end of the base frame member over said downwardly directed arm, and an operating device connected with the lower end of said blade.

2. A jig or scroll saw comprising a bottom frame member provided at one end with a curved upwardly and forwardly directed frame arm having an upwardly directed member provided with a vertically arranged slot or opening, said bottom frame member being also provided at its opposite end with a work piece support having a central hole or opening, a spring connected with the outer base portion of the curved frame arm and carried upwardly thereover and provided with an arm which is passed through the slot or opening in the upwardly directed member of said arm, a saw blade connected with the forward end of said spring arm and passed downwardly through the hole or opening in the work piece support, and a working device connected with the lower end of said saw blade.

3. A jig or scroll saw comprising a base frame member provided at one end with an upwardly directed frame arm, a spring secured to the upwardly directed frame arm and provided with an arm passing through a guide slot or opening in said upwardly directed frame arm, and a saw blade connected with the free end of the spring arm and passing downwardly through a work piece support connected with the base frame member.

4. A jig or scroll saw comprising a frame, consisting of a base member provided at one end with an upwardly directed frame arm and at the other end with a downwardly directed frame arm having a forwardly directed extension, a spring secured outwardly of the upwardly directed frame arm and provided with a spring arm passing through a vertically arranged slot or opening in the end thereof, a saw blade connected with the free end of the spring arm and passing downwardly through a work piece connected with the base frame member, and a bar connected with the lower end of said saw blade and passing downwardly through the slot or opening in the end portion of the downwardly directed frame arm.

In testimony that I claim the foregoing as my invention I have signed my name in presence of the subscribing witnesses this 18th day of May, 1906.

WILLIAM E. LAWRENCE.

Witnesses:
   C. E. MULREANY,
   A. WORDEN GIBBS.